United States Patent [19]

Shrader

[11] 4,025,825

[45] May 24, 1977

[54] METER POWER DISTRIBUTION APPARATUS FOR MOBILE HOMES WITH A DETACHABLE FRONT PANEL FOR POWER OUTLET FITTINGS

[76] Inventor: Delworth Shrader, 5088 Nerissa Way, San Jose, Calif. 95124

[22] Filed: July 24, 1975

[21] Appl. No.: 598,551

[52] U.S. Cl. .............................. 361/374; 339/32 M; 361/368; 361/369
[51] Int. Cl.² .......................................... H02B 9/00
[58] Field of Search .......... 317/104, 105, 107, 108, 317/111, 112, 120; 174/38; 200/50 A, 50 B; 339/19, 32 M, 198 M

[56] References Cited

UNITED STATES PATENTS

| 3,315,059 | 4/1967 | Jacks et al. | 200/50 B |
|---|---|---|---|
| 3,525,906 | 8/1970 | Schubert | 317/108 |
| 3,585,456 | 6/1971 | Phillips, Jr. | 317/112 |
| 3,716,762 | 2/1973 | Shrader | 317/108 |
| 3,806,857 | 4/1974 | Hubeny | 317/107 |

*Primary Examiner*—Gerald P. Tolin
*Attorney, Agent, or Firm*—Jack M. Wiseman

[57] ABSTRACT

A meter power distribution apparatus in which an interchangeable front panel has line and load stabs mounted thereon that are received, respectively, by load spring clips on a confronting panel for establishing an electrical connection to electrical outlets for a mobile home or the like.

9 Claims, 9 Drawing Figures

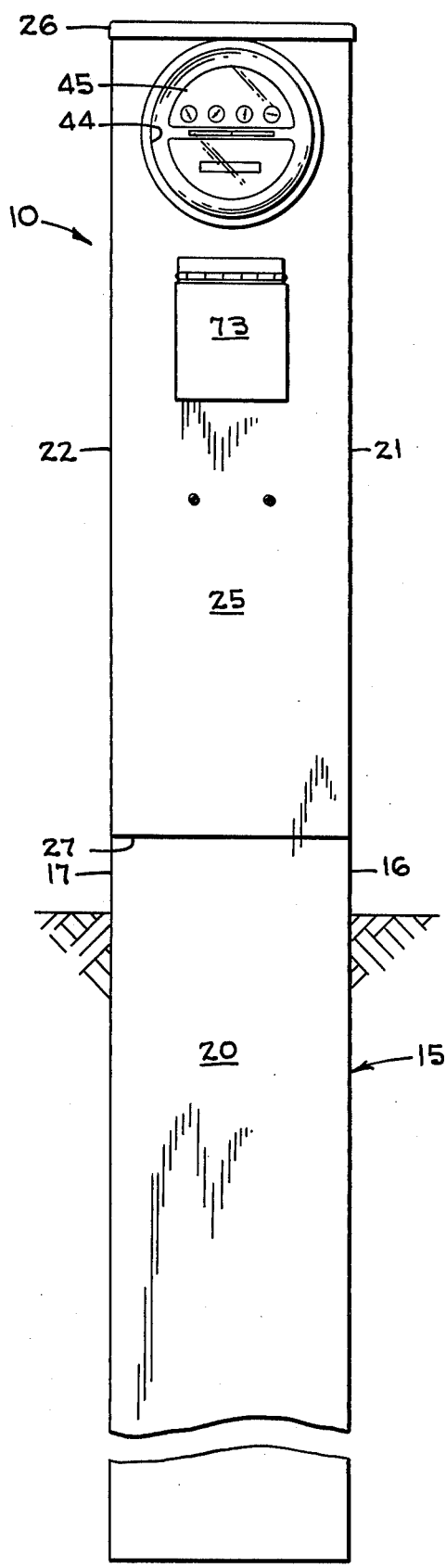
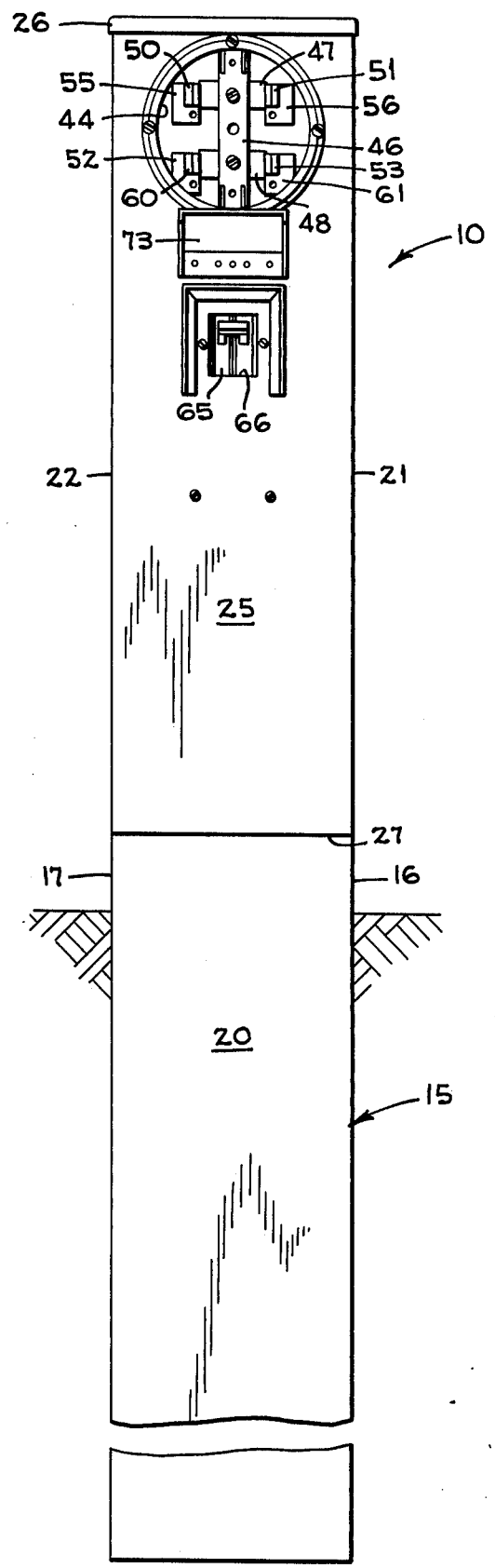

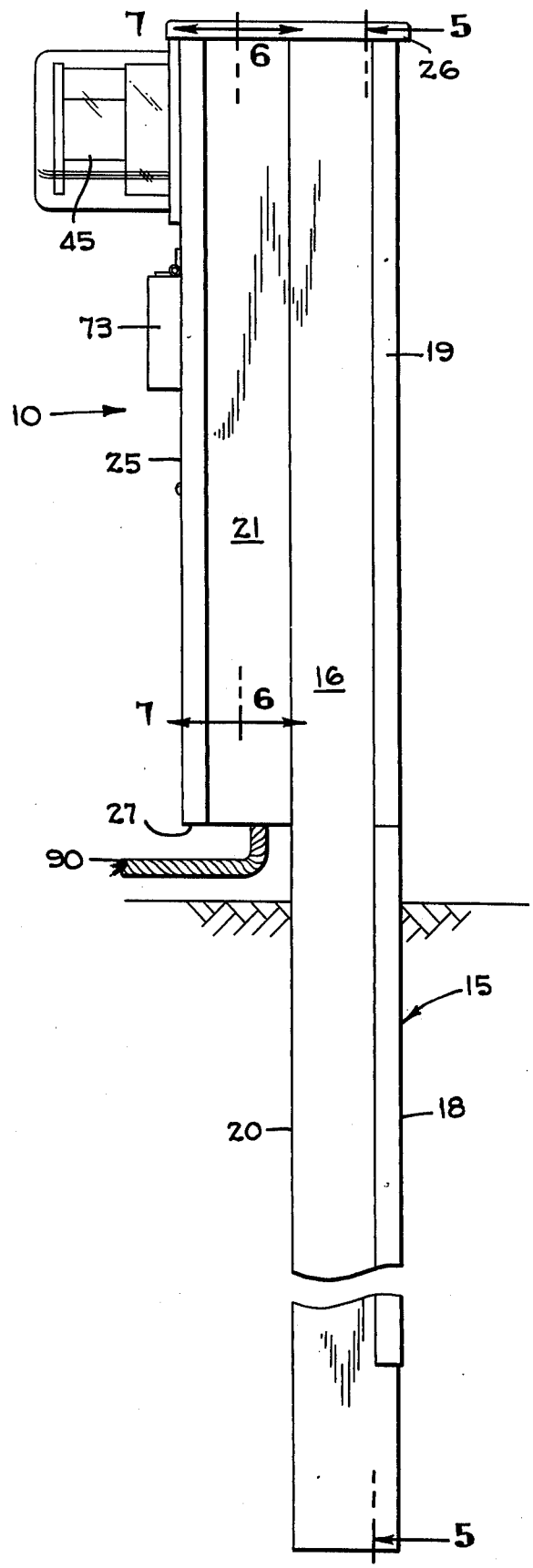
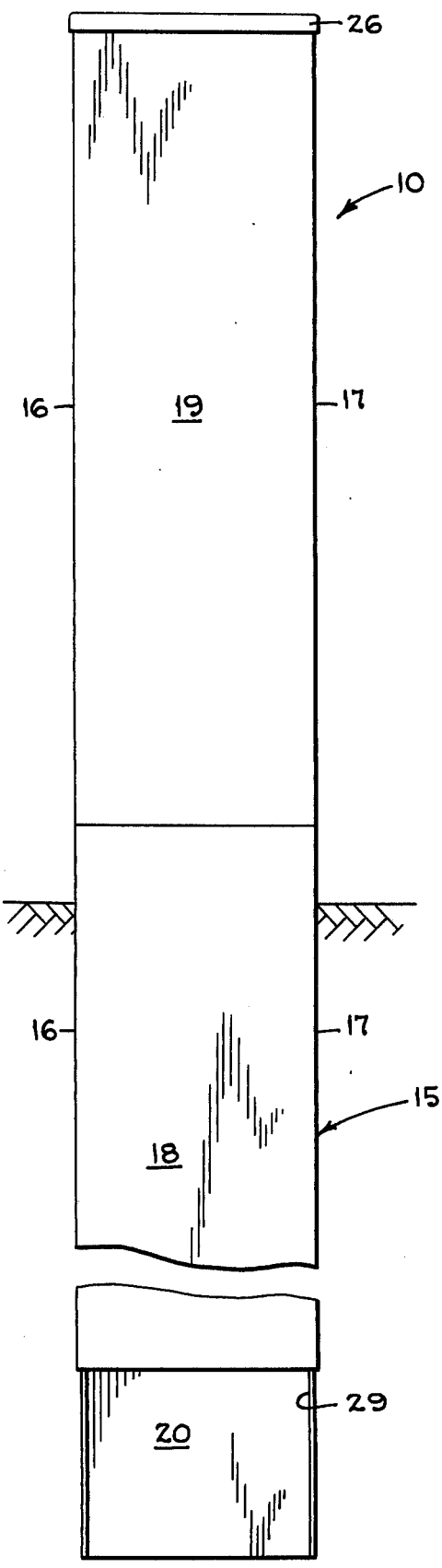

METER POWER DISTRIBUTION APPARATUS FOR MOBILE HOMES WITH A DETACHABLE FRONT PANEL FOR POWER OUTLET FITTINGS

BACKGROUND OF THE INVENTION

The present invention relates in general to meter power distribution apparatus and more particularly to a meter power distribution apparatus for mobile homes and the like with a detachable front panel for power outlet fittings.

Power distribution pedestals for mobile homes receive power from an underground electrical system and provide outlets and direct hookups through which power is distributed to the lighting systems, heating systems, appliances and the like in mobile homes and the like. If different ampere ratings are desired, the front panel is removed and a new front panel is installed in lieu thereof for the desired ampere ratings.

Such pedestals have been provided with various detachable front panels that are selected in accordance with the ampere ratings required to satisfy the needs of the mobile home owners and the services to be performed. Pedestals of this type are disclosed in U.S. Pat. No. 3,716,762, issued to the present inventor on Feb. 13, 1973, for Meter Power Distribution Apparatus For Mobile Homes With A Detachable Front Panel for Power Outlet Fittings, and in U.S. Pat. No. 3,585,456, issued to Lawrence Phillips, Jr. on June 15, 1971, for Electric Service Center For Mobile Homes And The Like.

In the patent to the present inventor, there is disclosed a meter power distribution apparatus in which anchor clips are connected to the meter line side of a watt-hour meter and anchor clips are connected to the load side of the watt-hour meter. The patent to Phillips discloses an electric service center for mobile homes and the like in which a spring clip jaw receptacle receives a stab-like connector for establishing an electrical connection therewith.

Heretofore, devices were employed to establish electrical connections from the underground metering and service equipment to the electrical outlets of the mobile homes and the like to provide customer service. Such devices were installed on underground metering and service equipment and were referred to as "cans." The installation of the "can" required the services of a knowledgeable mechanic.

SUMMARY OF THE INVENTION

A meter power distribution apparatus in which an interchangeable front panel and a confronting panel having mating connector conductors and receptacles for establishing electrical connections from the load side of a circuit breaker on the front panel to power outlet fitting connections of a mobile home or the like.

By virtue of this arrangement, the need for a can installed on the meter power distribution apparatus for establishing a connection with power outlets of a mobile home or the like has been obviated. Additionally, the services of a knowledgeable mechanic to make the installation are not required.

DESCRIPTION OF THE DRAWINGS

FIG. 1 is a front elevation view of a meter power distribution system embodying the present invention, illustrated installed in the ground.

FIG. 2 is a front elevation view of the meter power distribution system shown in FIG. 1 with the watt-hour meter removed and with the rain guard of the removable front panel in the elevated position for illustrating a circuit breaker of the front panel.

FIG. 3 is a side elevation view of the meter power distribution system shown in FIG. 1.

FIG. 4 is a rear elevation view of the meter power distribution system shown in FIG. 1.

DETAILED DESCRIPTION OF THE PREFERRED EMBODIMENT

Figure 5:
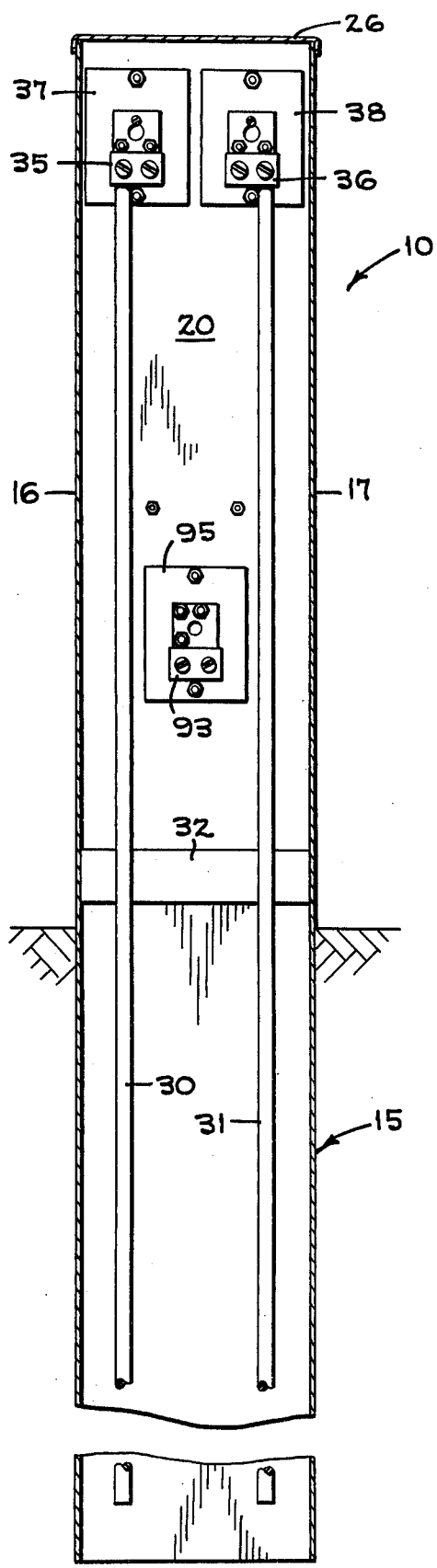
FIG. 5 is a vertical section view taken along line 5—5 of FIG. 3.

Illustrated in FIGS. 1–4 is the meter power distributing apparatus 10 embodying the present invention, which may be in the form of a meter pedestal or may be in the form of a meter switch box mounted on a pole or the like. For purposes of convenience, the meter pedestal is described herein in detail, although the inventive concepts are equally applicable to the meter switch box.

The meter power distributing apparatus 10 comprises a panel housing 15. Included in the panel housing 15 are upright confronting side panels 16 and 17 (FIG. 1) that extend the full height of the panel housing 15. A lower back panel 18 and an upper back panel 19 (FIG. 4) are attached to the side panels 16 and 17 to form an enclosure for the rear of the panel housing 15. At the lower portion of the lower back panel 18 is an opening 29 through which line conductors from a source of electrical power enter the panel housing 15. An upright panel 20 confronts the back panels 18 and 19. The upright panel 20 is fixed to the side panels 16 and 17 and extends the full height of the panel housing 15.

Mounted on the upright panel 20 are side panels 21 and 22, which extend from the top of the panel housing 15 to a point intermediate the ends of the side panels 16 and 17. Detachably mounted on the side panels 21 and 22 is a removable front panel 25. The front panel 25 and the lower portion of the upright panel 20 form the front of the panel housing 15. A top panel 26 seats on the front panel 25, the side panels 21 and 22, the upright panel 20, the side panels 16 and 17, and the upper rear panel 19. A bottom panel 27 is fixed to the side panels 21 and 22 and to the upright panel 20. Generally, the lower portions of the upright member 20, the side panels 16 and 17, the lower rear panel 18 are installed in the ground with the ground level as shown in FIG. 1.

Figure 6:
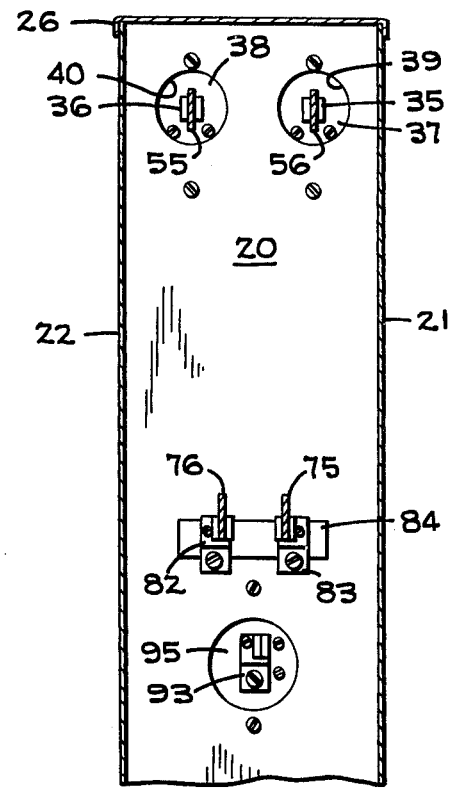
FIG. 6 is a vertical section view taken along line 6—6 of FIG. 3.

Conductors from a source of electrical power, such as public utility electrical lines, are received by the opening 29 (FIG. 4) in the panel housing 15 and are connected to suitable upright line conductors 30 and 31 (FIG. 5). The line conductors 30 and 31 pass through a suitable insulator, such as a sponge wall 32. The sponge wall serves to absorb any moisture collecting in the vicinity thereof. The line conductors 30 and 31 are connected at the upper ends thereof to suitable line connectors or terminals 35 and 36 (FIGS. 5 and 6), which are mounted on suitable insulators 37 and 38. The insulators 37 and 38 are in the form of phenolic bases which are fixed to the upright panel 20. Suitable openings 30 and 40 are formed in the upright panel 20 for the reception of the line connectors 35 and 36.

In the preferred embodiment, the line connectors 35 and 36 are spring clip receptacles with jaws and are tin-plated copper. The terminal portions of the connectors 35 and 36 are conventional receptacles for receiving plugs and the like secured in place by screws.

Formed in the removable or detachable front panel 25 is an opening 44 (FIGS. 1 and 2), in which is seated a conventional watt-hour meter 45 (FIG. 1). The watt-hour meter 45 includes a line side and a load side. Disposed in the opening 44 is an upright support member 46 (FIG. 2). Fixed to the support member 46 are horizontally disposed, vertically spaced insulators 47 and 48. Mounted on each end of the insulator 47 and facing the meter 45 are line connectors 50 and 51 (FIG. 2). The line connectors 50 and 51 are preferably in the form of spring clip receptacles with jaws that are tin-plated copper. In a similar manner, mounted on each end of the insulator 48 and facing the meter 45 are load connectors 52 and 53 (FIG. 2). The load connectors 52 and 53 are also preferably in the form of spring clip receptacles with jaws that are tin-plated copper.

Figure 7:
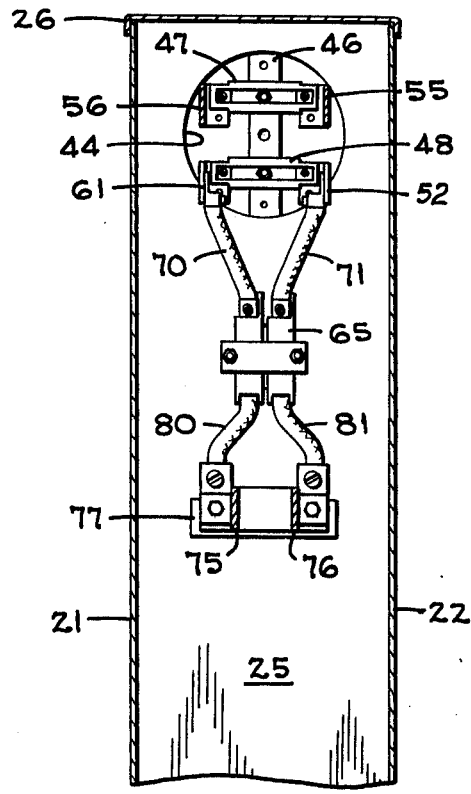
FIG. 7 is a vertical section view taken along line 7—7 of FIG. 3.
Figures 8, 9:
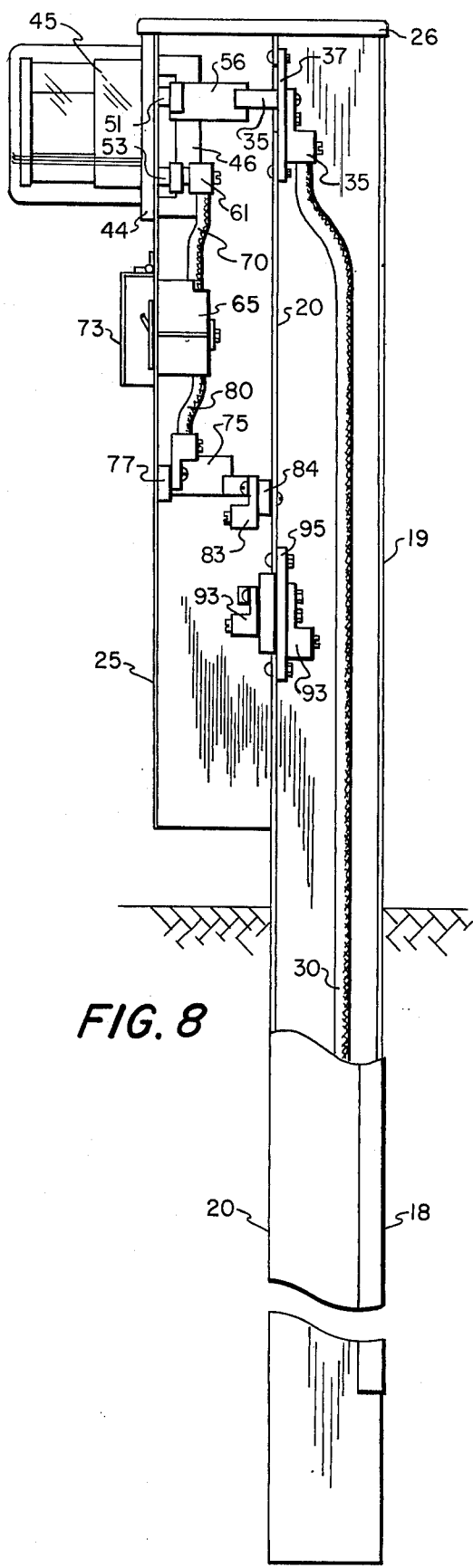
FIG. 8 is a right side elevation view of the meter power distribution system shown in FIGS. 1–7 with a side panel thereof removed.
FIG. 9 is a left side elevation view of the meter power distribution system shown in FIGS. 1–8 with a side panel thereof removed.

Mounted on each end of the insulator 47 and facing the upright panel 20 are stab-type line connectors 55 and 56 (FIG. 7). The stab-type line connectors 55 and 56 are preferably made of copper and are received respectively by the line connector receptacles 35 and 36, when the detachable front panel 25 is mounted on the panel housing 15. Additionally, the line connectors 55 and 56 engage the line receptacles 50 and 51, respectively, for establishing electrical connections therewith. Thus, when the detachable front panel 25 is mounted on the panel housing 15, electrical connections are established from the line conductors 30 and 31, through the line receptacle connectors 35 and 36, through the stab-type line connectors 55 and 56 and to the line receptacle connectors 50 and 51.

When the front panel 25 is mounted on the panel housing 15 and the meter 45 is installed, then electrical connections are established through the meter 45 from the line receptacle connectors 50 and 51 to the load receptacle connectors 52 and 53. The meter 45 includes stab-like connectors received respectively by the spring clip receptacles 50–53, when installed. Mounted on each end of the insulator 48 and facing the upright panel 20 are suitable terminals 60 and 61 (FIG. 7). For convenience, the load terminals 60 and 61 are in the form of stab-type load connectors, which are made of copper.

Mounted on the detachable front panel 25 is a suitable circuit breaker 65 (FIGS. 2 and 7). A suitable opening 66 is formed in the removable front panel 25 for seating the circuit breaker 65. It is conventional and also within the purview of the present invention to mount suitable power fittings on the detachable front panel 25. Should it be desired that the meter power distributing apparatus 10 have a different ampere rating or should it be desired to include power fittings or different power fittings, then the front panel 25 is removed and replaced with a similar preselected front panel.

Suitable conductors 70 and 71 interconnect the terminals 60 and 61 with the input side of the circuit breaker 65. A suitable rain cover 73 is pivotally mounted on the front panel 25. When in the downward position (FIG. 1), the rain cover 73 protects the circuit breaker 65 from the elements. When in the raised position (FIG. 2), the cover 73 exposes the circuit breaker 65.

According to the present invention, load connectors 75 and 76 (FIG. 7) are mounted on a suitable insulator 77, such as a phenolic insulator. In turn, the insulator is mounted on the removable front panel 25. The load connectors 75 and 76 confront the upright panel 20. Conductors 80 and 81 establish electrical connections from the output side of the circuit breaker 65 to the terminals of the load connectors 75 and 76. In the preferred embodiment, the load connectors 75 and 76 are in the form of stab-type connectors made of tin-plated copper.

Mating with the load connectors 75 and 76 are load connectors 82 and 83 (FIG. 6) which are mounted on an insulator base 84. The insulator base 84 is preferably made of phenolic material. In turn, the insulator base 84 is mounted on the upright member 20 so that the load connectors 82 and 83 face the load connectors 75 and 76. In the preferred embodiment, the load connectors 82 and 83 are spring clip receptacles with jaws and are made of tin-plated copper. When the detachable front panel 25 is mounted on the panel housing 15, the load connectors 75 and 76 establish electrical connections with the load connectors 82 and 83.

The load connectors 82 and 83 are connected to outlet fittings of a mobile home or the like for supplying electricity to the mobile home or the like to operate appliances, lighting systems, heating systems and the like. In a typical embodiment, an insulated flexible cable 90 (FIG. 3) leading to the outlet fittings of a mobile home or the like is received by a suitable opening. The opening may be in the bottom panel 27. The flexible cable 90 is connected to the load connectors 82 and 83 (FIG. 6) in a conventional and well-known manner. A terminal 93 is connected to the neutral terminal for the mobile home. The terminal 93 is mounted on the insulated block 95.

I claim:

1. A meter power distribution system comprising:
   a. a housing with an upright panel and with a removable front panel facing said upright panel;
   b. a meter supported by said removable front panel, said meter having line terminals and load terminals;
   c. first means in said housing connected to said line terminals of said meter for supplying electrical power to said meter;
   d. a circuit element mounted on said removable panel;
   e. second means in said housing electrically connecting said load terminals of said meter to the input of said circuit element;
   f. first electrical load connectors mounted on said removable panel facing said upright panel;
   g. means in said housing electrically connecting said first electrical load connectors to the output of said circuit element; and
   h. second electrical load connectors mounted on said upright panel and mating with said first electrical load connectors for establishing electrical connections with electrical loads.

2. A meter power distribution system as claimed in claim 1 wherein said first and second electrical load connectors are mating stab-type connectors and spring clip receptacles.

3. A meter power distribution system as claimed in claim 2 wherein said circuit element is a circuit breaker.

4. A meter power distribution system as claimed in claim 2 wherein said first means includes first electrical line connectors on said removable front panel facing said upright panel, and second electrical line connectors on said upright panel mating with said first electrical line connectors for establishing electrical connections therewith.

5. A meter power distribution system as claimed in claim 4 wherein said first and second electrical line connectors are mating stab-type connectors and spring clip receptacles.

6. A meter power distribution system as claimed in claim 4 wherein said first electrical line connectors face said meter, said line terminals of said meter and said first electrical line connectors mating for establishing electrical connections therewith.

7. A meter power distribution system as claimed in claim 6 wherein said first electrical line connectors and said line terminals of said meter are mating stab-type connectors and spring clip receptacles.

8. A meter power distribution system as claimed in claim 7 wherein said second means includes third electrical load connectors mounted on said removable front panel facing said meter, said load terminals of said meter and said third electrical load connectors mating for establishing electrical connections.

9. A meter power dstribution system as claimed in claim 8 wherein said third electrical load connectors and said load terminals of said meter are mating stab-type connectors and spring clip receptacles.

* * * * *